(12) United States Patent
Zhang et al.

(10) Patent No.: US 9,571,668 B1
(45) Date of Patent: Feb. 14, 2017

(54) ENABLING A TOLL-FREE DATA SERVICE BASED ON A TYPE OF NETWORK CONNECTION

(71) Applicant: Verizon Patent and Licensing Inc., Arlington, VA (US)

(72) Inventors: Gong Zhang, Waltham, MA (US); Jian Huang, Sudbury, MA (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 0 days.

(21) Appl. No.: 14/757,492

(22) Filed: Dec. 23, 2015

(51) Int. Cl.
*H04M 15/00* (2006.01)
*H04L 29/12* (2006.01)

(52) U.S. Cl.
CPC ...... *H04M 15/8214* (2013.01); *H04L 61/1588* (2013.01); *H04M 15/8094* (2013.01)

(58) Field of Classification Search
None
See application file for complete search history.

(56) References Cited

U.S. PATENT DOCUMENTS

| | | | |
|---|---|---|---|
| 2015/0067819 A1* | 3/2015 | Shribman | H04L 67/06 726/12 |
| 2016/0087933 A1* | 3/2016 | Johnson | G06F 17/30861 709/245 |
| 2016/0105530 A1* | 4/2016 | Shribman | H04L 67/06 709/218 |

\* cited by examiner

*Primary Examiner* — Diane Mizrahi (57) ABSTRACT

A device may detect a change in a connection being used for network access. The device may send a message, including a domain name, based on detecting the change in the connection. The device may receive a response from either a first device or a second device based on sending the message. The first device and the second device may be associated with the domain name and may have different network addresses. The device may selectively enable or disable a toll-free data service based on the response.

20 Claims, 7 Drawing Sheets

ENABLING A TOLL-FREE DATA SERVICE BASED ON A TYPE OF NETWORK CONNECTION

BACKGROUND

Content providers, such as online media companies, may wish to deliver content to network users. Network users may pay a network data usage fee to access the content. Some content providers may choose to subsidize the cost of network data usage, associated with the content, which would otherwise be paid by the network users accessing the content.

DETAILED DESCRIPTION OF PREFERRED EMBODIMENTS

The following detailed description of example implementations refers to the accompanying drawings. The same reference numbers in different drawings may identify the same or similar elements.

A content provider may want to provide content to a network user. A toll-free data service may permit the content provider to provide content to a network user by subsidizing the cost of network data usage associated with receiving the content, which would ordinarily be charged to the network user. A network operator may want to ensure that network data usage is charged to the appropriate party (e.g., either the content provider or the network user).

One way to ensure appropriate charges is to convert a non-toll free resource identifier (e.g., a uniform resource identifier, such as a uniform resource locator (URL)) for a resource (e.g., content) to a toll-free resource identifier when the content provider is to be charged for data usage. If the non-toll free resource identifier is used to access the resource, then the network operator may charge the network user for network data usage. If the toll-free resource identifier is used to access the resource, then the network operator may charge the content provider for network data usage.

A user device may receive a toll-free resource identifier for use with the toll-free data service by sending a validation request to a validation device (e.g., associated with a network operator), which may validate the request and/or the toll-free resource identifier. However, the validation device may be inaccessible via particular networks (e.g., networks other than a network associated with the network operator). Additionally, the toll-free data service may only apply to network usage associated with a particular network (e.g., a cellular network associated with the network operator) and/or may not apply to network usage associated with another network (e.g., a wireless local area network (WLAN)).

In some cases, the user device may not have information regarding whether the user device is connected to a network associated with the toll-free data service. For example, the user device may use a radio access technology (e.g., Wi-Fi) to connect to another device (e.g., a mobile WLAN device), and the other device may connect to a network associated with the toll-free data service using another radio access technology (e.g., long term evolution (LTE), etc.). In such cases, the user device may determine that the user device is using a WLAN for network access, despite the underlying content delivery being facilitated via a cellular network (e.g., an LTE network, etc.). Thus, the user device may not send validation requests when accessing content that is associated with a toll-free data service.

In other cases, a user device may send validation requests when the user device is accessing a network that is not associated with the toll-free data service (e.g., when the user device is accessing a WLAN). For example, the user device may send validation requests, which may not be received by a validation device, thereby consuming user device battery and/or processor resources and/or network resources.

Implementations described herein may assist a user device in enabling or disabling a toll-free data service based on a type of network connection of the user device. Implementations described herein may conserve user device processor, memory, and/or battery resources and/or network resources by disabling the toll-free data service when the user device is not connected to a network associated with the toll-free data service. For example, implementations described herein may reduce a quantity of validation requests that are sent by the user device. Additionally, implementations described herein may assist a user device in enabling the toll-free data service when the user device is accessing a network associated with the toll-free data service.

Figure 1A:
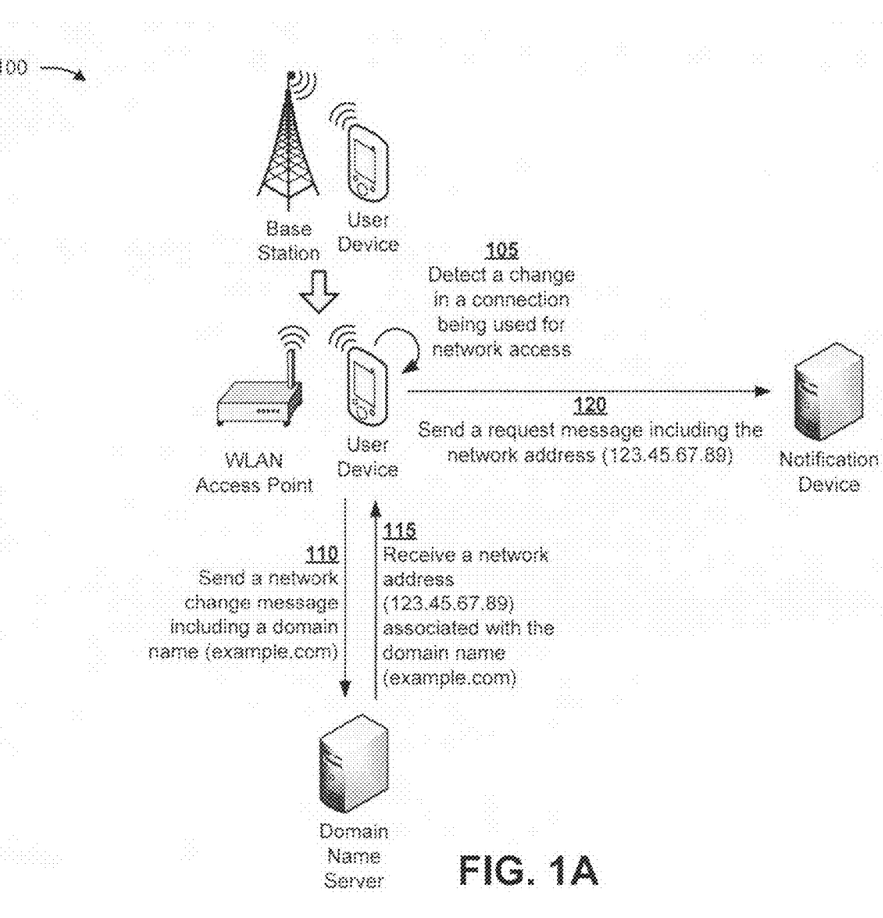
FIGS. 1A-1D are diagrams of an overview of an example implementation described herein.

FIGS. 1A-1D are diagrams of an overview of an example implementation 100 described herein. As shown in FIG. 1A, and by reference number 105, a user device may detect a change in a connection being used for network access. For example, assume that the user device switches from being connected to a base station to being connected to a WLAN access point (e.g., a Wi-Fi access point, or the like). As shown by reference number 110, the user device may send a network change message, including a domain name (e.g., "example.com"), based on detecting the change to the connection. Based on the user device using the WLAN access point for network access, a domain name server may receive the network change message and may identify a network address (e.g., an internet protocol (IP) address, such as "123.45.678.9") associated with the domain name (e.g., "example.com").

As shown by reference number 115, the user device may receive the network address (e.g., "123.45.67.89") and, as shown by reference number 120, may send a request message that includes the network address. For example, assume that the network address (e.g., "123.45.67.89") is associated with a notification device. In some implementations, the request message may include a request for information identifying a particular network that the user device is using for network access and/or may request information identifying whether to enable or disable a toll-free data service.

Figure 1B:
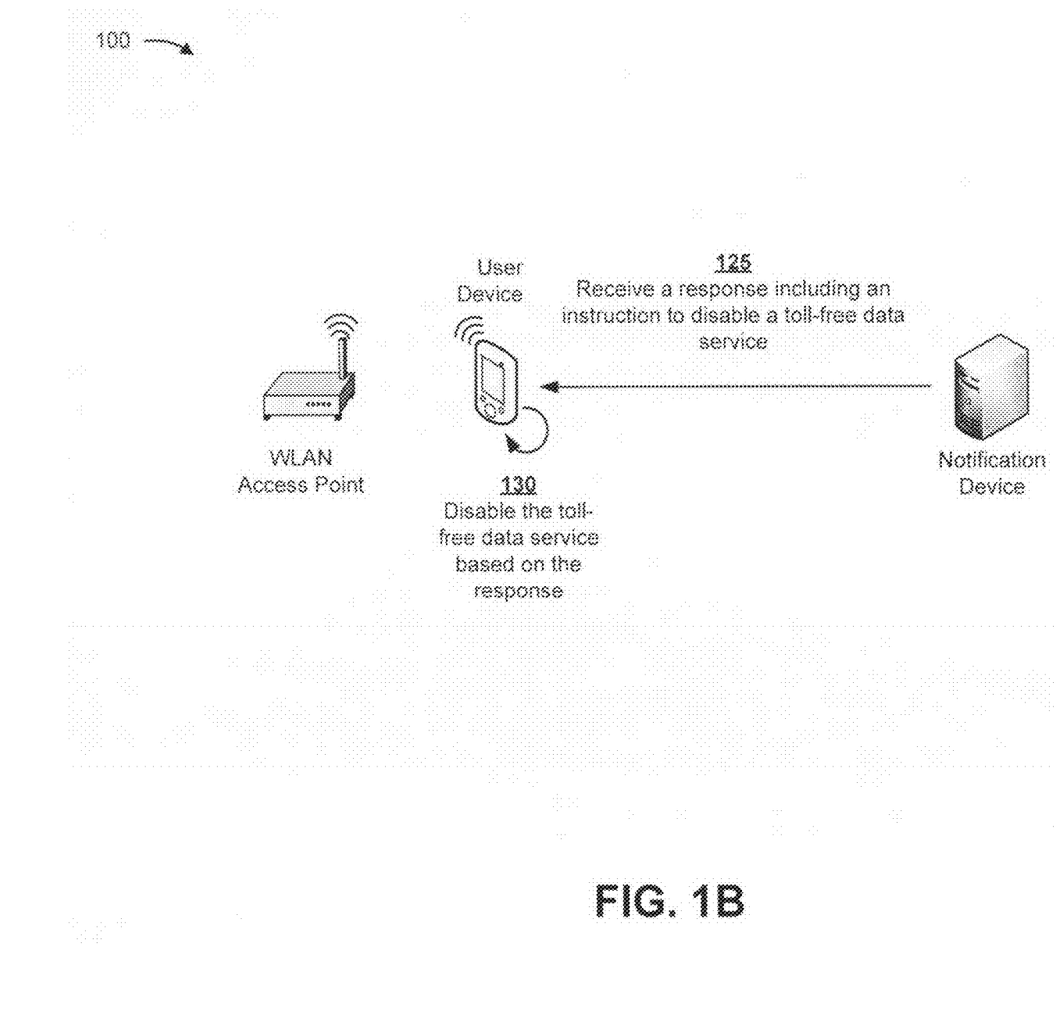

As shown in FIG. 1B, and by reference number 125, the user device may receive a response, from the notification device, that includes an instruction to disable the toll-free data service (e.g., because the user device accesses the network using a WLAN, which does not consume cellular data to be charged to the user). As shown by reference number 130, the user device may disable the toll-free data service based on the response. In this way, the user device may determine that the user device is not accessing a network associated with a toll-free data service based on the response, and may disable the toll-free data service accordingly.

Figure 1C:
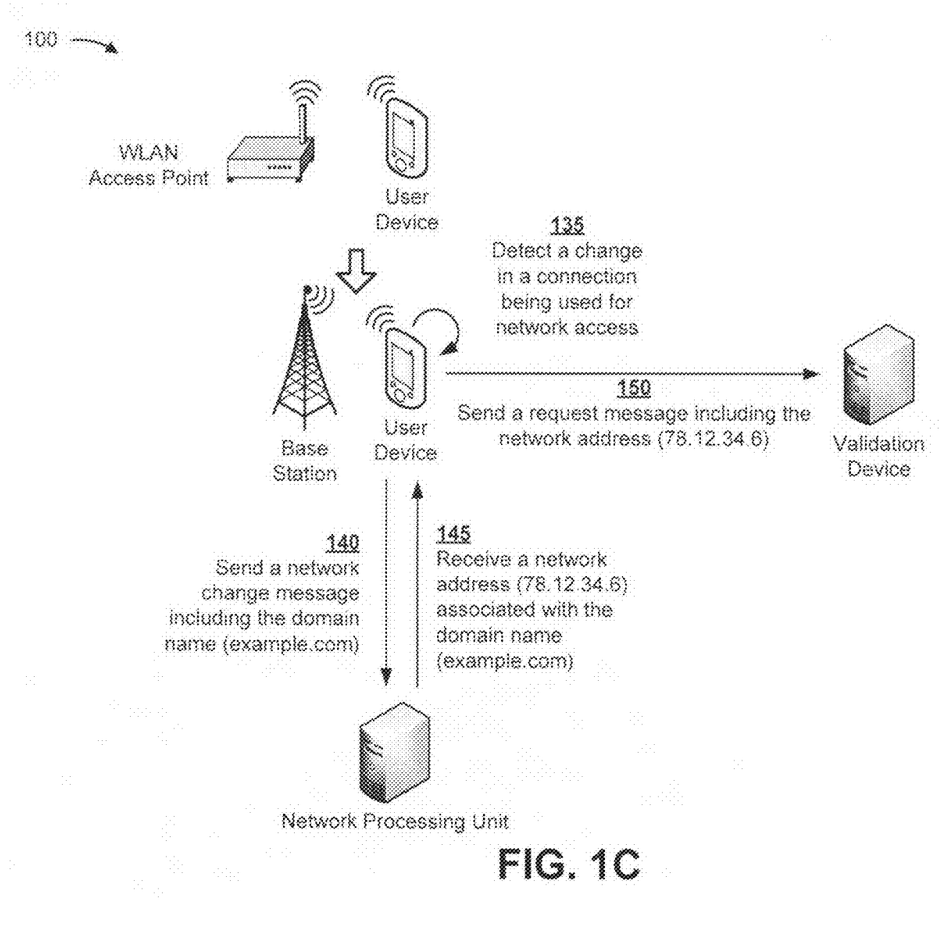

As shown in FIG. 1C, and by reference number 135, the user device may detect another change in a connection being used for network access. For example, assume that the user device switches from being connected to a WLAN access point (e.g., associated with a WLAN) to being connected to a base station (e.g., associated with a cellular network). As shown by reference number 140, the user device may send a network change message, including the domain name (e.g., the same domain name shown in FIG. 1A), based on detecting the change to the connection. For example, assume that a device (e.g., a network processing unit) receives the network change message (e.g., rather than a domain name server receiving the network change message) based on the user device accessing the cellular network via the base station.

For example, assume that the network processing unit identifies a network address (e.g., "78.12.34.6") associated with the domain name (e.g., "example.com"). As shown by reference number 145, the user device may receive the network address from the network processing unit. As shown by reference number 150, the user device may send a request message that includes the network address (e.g., "78.12.34.6"). For example, assume that a validation device is associated with the network address (e.g., "78.12.34.6").

Figure 1D:
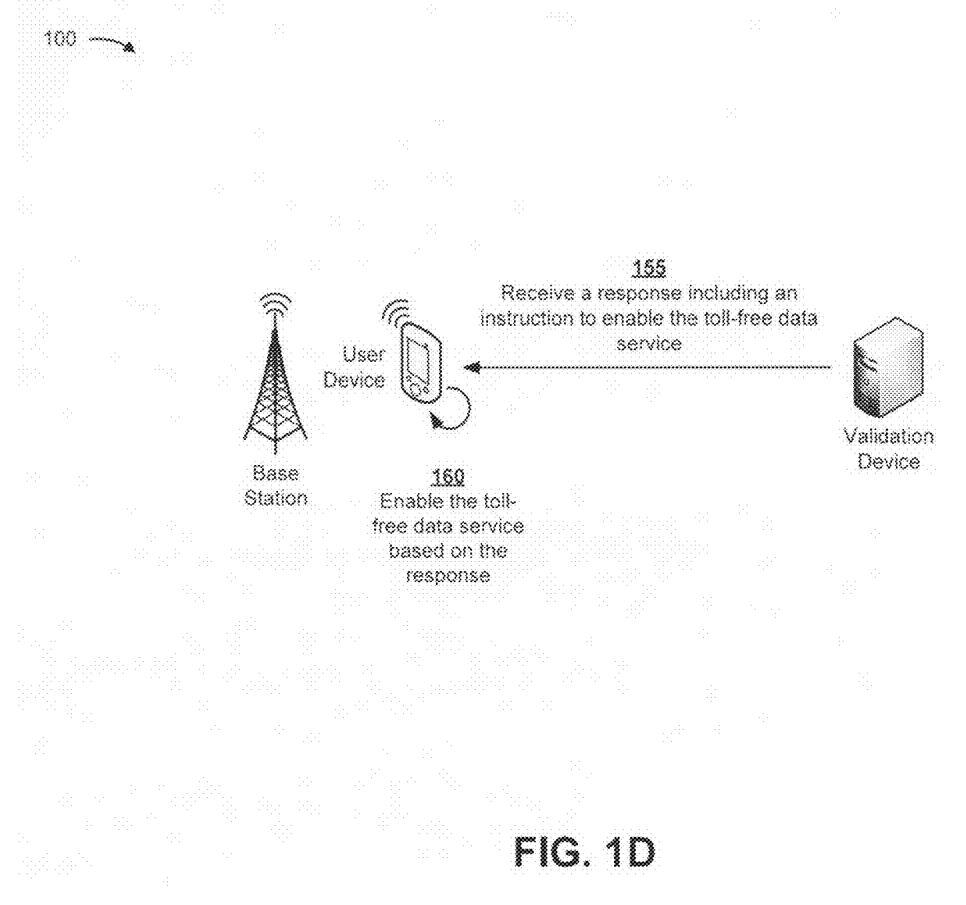

As shown in FIG. 1D, and by reference number 155, the user device may receive a response, from the validation device, including an instruction to enable the toll-free data service (e.g., because the user device accesses the network using a cellular network, which consumes cellular data that may be charged to the user or a content provider). As shown by reference number 160, the user device may enable the toll-free data service based on the response. In this way, the user device may determine that the user device is accessing a network (e.g., the cellular network) associated with a toll-free data service based on the response, and may enable the toll-free data service accordingly.

In this way, the user device may send a network change message, including a domain name, based on detecting a change in a connection being used for network access. Based on the type of network (e.g., a WLAN, a cellular network, etc.) that the user device uses for network access, a different device (e.g., the network processing unit or the domain name server) may receive the network change message. Further, the network processing unit and the domain name server may provide the user device with different network addresses associated with the domain name.

For example, the notification device and the validation device may share the same domain name. However, the notification device and the validation device may have different network addresses (e.g., IP addresses, etc.). The user device may provide a request message to either the validation device or the notification device, based on which network type is used for network access, and may receive a response. In this way, the user device may determine whether to enable or disable a toll-free data service based on whether the user device uses a network compatible with the toll-free data service for network access.

Implementations described herein may conserve user device processor and/or battery resources and/or network resources by disabling a toll-free data service when the user device is not accessing a network associated with the toll-free data service. Additionally, implementations described herein may assist a user device in enabling a toll-free data service when the user device is accessing a network associated with the toll-free data service.

As indicated above, FIGS. 1A-1D are provided merely as an example. Other examples are possible and may differ from what was described with regard to FIGS. 1A-1D.

Figure 2:
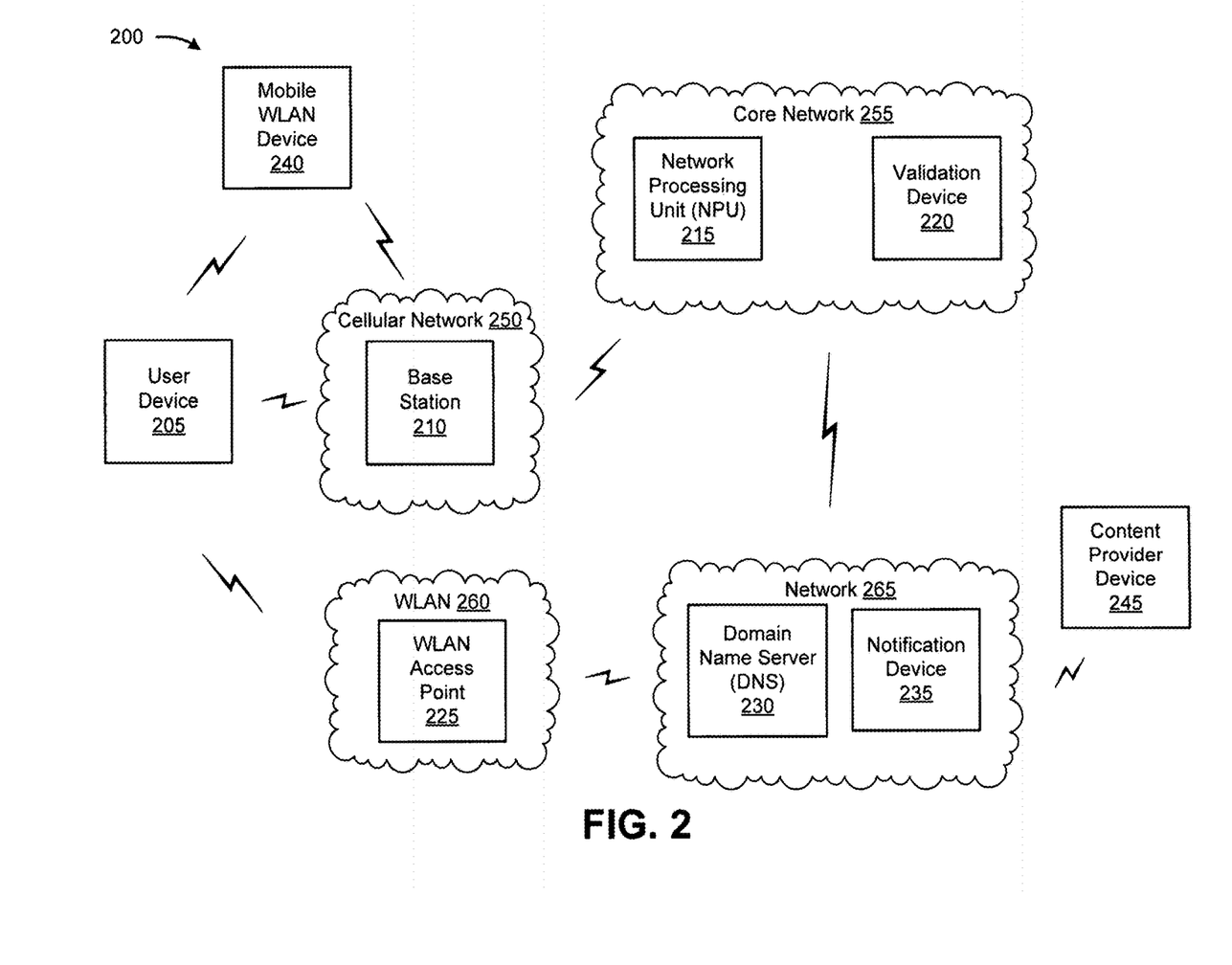
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 205, a base station 210, a network processing unit (NPU) 215, a validation device 220, a WLAN access point 225, a domain name server (DNS) 230, a notification device 235, a mobile WLAN device 240, a content provider device 245, a cellular network 250, a core network 255, a WLAN 260, and a network 265. Devices of environment 200 may interconnect via wired connections, wireless connections, or a combination of wired and wireless connections.

User device 205 may include one or more devices capable of receiving, generating, storing, processing, and/or providing information associated with a toll-free data service. For example, user device 205 may include a communication and computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), a set-top box, or a similar type of device. In some implementations, user device 205 may be associated with an account that is charged based on network data usage by user device 205. User device 205 may send traffic to and/or receive traffic from cellular network 250 (e.g., via base station 210 and/or WLAN device 240) and/or WLAN 260 (e.g., via WLAN access point 225).

Base station 210 may include one or more devices capable of transferring traffic, such as audio, video, text, and/or other traffic, destined for and/or received from user device 205. In some implementations, base station 210 may include an evolved Node B (eNB) associated with an LTE network. Additionally, or alternatively, base station 210 may be associated with a radio access network (RAN) that is not associated with an LTE network. Base station 210 may send traffic to and/or receive traffic from user device 205 via an air interface. In some implementations, base station 210 may include a small cell base station, such as a base station of a microcell, a picocell, and/or a femtocell.

NPU 215 may include one or more devices capable of receiving, processing, storing, and/or transferring traffic associated with cellular network 250. For example, NPU 215 may include a server, a gateway, a firewall, a router, or a similar device. In some implementations, NPU 215 may be included in core network 255. In some implementations, NPU 215 may be included in base station 210. In some implementations, NPU 215 may receive information that identifies a domain name, and may provide information that identifies a network address mapped to the domain name (e.g., a network address of validation device 220).

Validation device 220 may include one or more devices capable of receiving, storing, processing, and/or providing information associated with a toll-free data service. For example, validation device 220 may include a computing device, such as a server device or a similar device. In some implementations, validation device 220 may provide user device 205 with information indicating that user device 205 is using cellular network 250 for network access and/or may provide an instruction to user device 205 to enable a toll-free data service.

WLAN access point 225 may include one or more devices capable of providing access to WLAN 260. For example, WLAN access point 225 may include a router, a gateway, a base station, or another form of access point. In some implementations, WLAN access point 225 may receive, process, and/or transmit data traffic, such as media, audio, video, text, and/or other data traffic, destined for and/or received from user device 205. In some implementations, WLAN access point 225 may employ one or more short-range wireless communication protocols for a wireless personal area network (WPAN) and/or a WLAN, such as, for example, IEEE 802.15 (e.g., Bluetooth) and IEEE 802.11 (e.g., Wi-Fi). In other implementations, different short-range wireless protocols and/or frequencies may be used.

DNS 230 may include one or more devices capable of translating a domain name into a network address (e.g., an IP address, or the like). For example, DNS 230 may include a server or a similar device. DNS 230 may receive information that identifies a domain name, and may provide information that identifies a network address mapped to the domain name (e.g., a network address of notification device 235). DNS 230 may store a data structure that maps domain names to network addresses.

Notification device 235 may include one or more devices capable of receiving, generating, storing, processing, and/or providing information associated with a toll-free data service. For example, notification device 235 may include a computing device, such as a server device or a similar device. In some implementations, notification device 235 may provide information to user device 205 indicating that user device 205 is using WLAN 260 for network access and/or may provide an instruction to user device 205 to disable a toll-free data service.

Mobile WLAN device 240 may include one or more devices capable of providing communications between user device 205 and base station 210. For example, mobile WLAN device 240 may include an intelligent mobile hotspot, a mobile device acting as a WLAN router, or the like. In some implementations, mobile WLAN device 240 may connect to user device 205 using a first network access technology (e.g., Wi-Fi, Bluetooth, universal serial bus (USB), Ethernet, etc.), and may connect to base station 210 using a second network access technology (e.g., a radio access technology, such as LTE, or the like). In some implementations, mobile WLAN device 240 may be associated with an account that is charged based on network data usage by mobile WLAN device 240.

Content provider device 245 may include one or more devices capable of providing content (e.g., to user device 205). For example, content provider device 245 may include a server device (e.g., a host server, a web server, an application server, etc.) or a similar device. Content provider device 245 may be associated with a content provider that provides a toll-free data service, where the content provider is charged for data usage rather than an end user associated with user device 205 and/or mobile WLAN device 240.

Cellular network 250 may include one or more networks that utilize a cellular radio access technology, such as an LTE network, a third generation (3G) network, a fourth generation (4G) network, a code division multiple access (CDMA) network, or the like. For example, cellular network 250 may include a radio access network (RAN) that includes one or more base stations 210 via which user device 205 and/or mobile WLAN device 240 may communicate with core network 255. For example, user device 205 and/or mobile WLAN device 240 may use cellular network 250 for network access (e.g., to access core network 255 and/or network 265).

Core network 255 may include one or more networks, such as, for example an evolved packet core (EPC) network and/or an IP Multimedia Subsystem (IMS) network. In some implementations, core network 255 may provide connectivity for user device 205 and/or mobile WLAN device 240 to external packet data networks. In some implementations, core network 255 may be associated with a network operator that manages and/or operates core network 255, such as, for example, a telecommunication service provider, a television service provider, an Internet service provider, a wireless service provider, or the like. In some implementations, a network operator may receive information associated with data usage associated with a toll-free data service and may cause a user of user device 205 and/or mobile WLAN device 240 or a content provider to be billed for the data usage.

WLAN 260 may include a wireless local area network (e.g., a WLAN). In other implementations, WLAN 260 may be replaced with a wide area network (WAN), a metropolitan area network (MAN), a data network, an ad hoc network, and/or a combination of these or other types of networks. In some implementations, user device 205 may use mobile WLAN 260 for network access (e.g., to access network 265).

Network 265 may include one or more wired and/or wireless networks. For example, network 265 may include a WLAN (e.g., a Wi-Fi network), a LAN, a WAN, a MAN, a private network, an ad hoc network, an intranet, the Internet, a fiber optic-based network, a cloud computing network, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
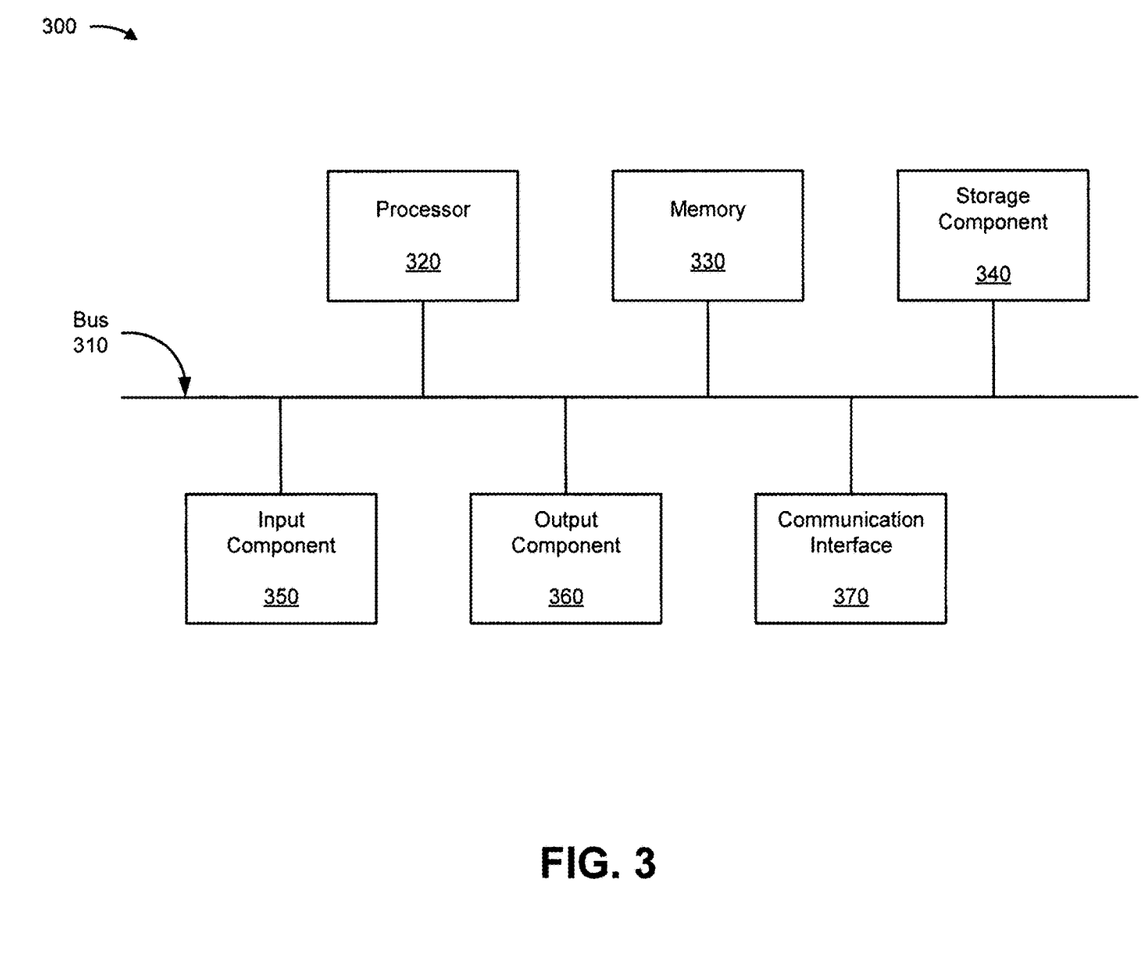
FIG. 3 is a diagram of example components of one or more devices of FIG. 2.

FIG. 3 is a diagram of example components of a device 300. Device 300 may correspond to user device 205, base station 210, NPU 215, validation device 220, WLAN access point 225, DNS 230, notification device 235, mobile WLAN device 240, and/or content provider device 245. In some implementations, user device 205, base station 210, NPU 215, validation device 220, WLAN access point 225, DNS 230, notification device 235, mobile WLAN device 240, and/or content provider device 245 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. In some implementations, processor 320 may include one or more processors capable of being programmed to perform a function.

Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of non-transitory computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a USB interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
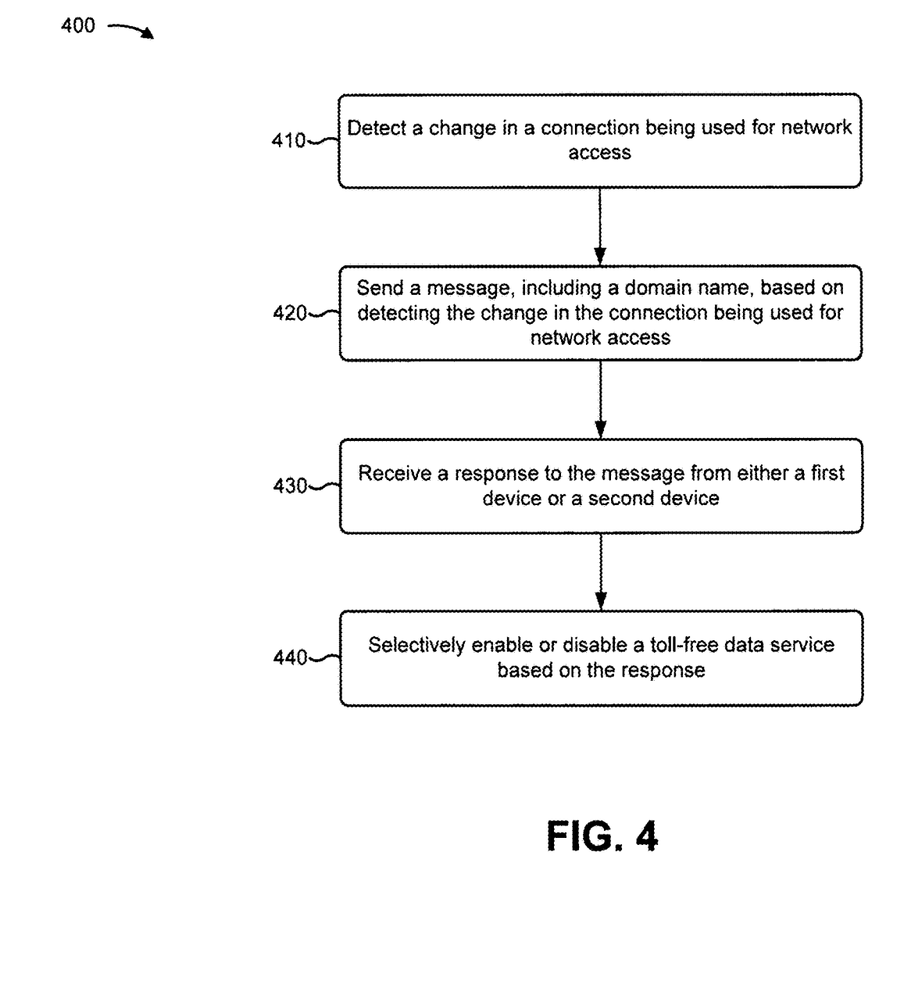
FIG. 4 is a flow chart of an example process for enabling or disabling a toll-free data service based on type of a network connection.

FIG. 4 is a flow chart of an example process 400 for enabling or disabling a toll-free data service based on a type of network connection. In some implementations, one or more process blocks of FIG. 4 may be performed by user device 205. In some implementations, one or more process blocks of FIG. 4 may be performed by another device or a group of devices separate from or including user device 205, such as base station 210, NPU 215, validation device 220, WLAN access point 225, DNS 230, notification device 235, mobile WLAN device 240, and/or content provider device 245.

As shown in FIG. 4, process 400 may include detecting a change in a connection being used for network access (block 410). For example, user device 205 may detect a change in a connection being used to access either cellular network 250 or WLAN 260. For example, user device 205 may detect a change in a connection being used to access either cellular network 250 or WLAN 260 based on connecting to, switching from being connected to, and/or disconnecting from base station 210, WLAN access point 225, and/or mobile WLAN device 240, in some implementations.

In some implementations, user device 205 may detect the change based on switching from being connected to base station 210 (e.g., using a radio access technology, such as LTE, 3G, or the like) to being connected to WLAN access point 225 (e.g., using a radio access technology, such as Wi-Fi, Bluetooth, or the like). Additionally, or alternatively, user device 205 may detect the change based on switching from being connected to WLAN access point 225 to being connected to base station 210.

In some implementations, user device 205 may detect the change based on switching from being connected to WLAN access point 225 to being connected to mobile WLAN device 240 (e.g., via a network access technology, such as Wi-Fi, Bluetooth, Ethernet, USB, or the like). Additionally, or alternatively, user device 205 may detect the change based on switching from being connected to mobile WLAN device 240 to being connected to WLAN access point 225.

In some implementations, user device 205 may detect the change based on switching from being connected to base station 210 to being connected to mobile WLAN device 240. Additionally, or alternatively, user device 205 may detect the change based on switching from being connected to mobile WLAN device 240 to being connected to base station 210.

In some implementations, user device 205 may detect the change based on switching from being connected to mobile WLAN device 240 to being connected to another mobile WLAN device 240. Additionally, or alternatively, user device 205 may detect the change based on switching from being connected to WLAN access point 225 to being connected to another WLAN access point 225. Additionally, or alternatively, user device 205 may detect the change based on switching from being connected to base station 210 to another base station 210.

In this way, user device 205 may detect a change in a connection being used for network access, and may send a network change message and/or a request message to identify the particular network (e.g., either cellular network 250 or WLAN 260) that is being used for network access, as described below.

As further shown in FIG. 4, process 400 may include sending a message, including a domain name, based on detecting the change in the connection being used for network access (block 420). For example, user device 205 may send a network change message, including a domain name, based on detecting the change in the connection being used to access either cellular network 250 or WLAN 260. In some implementations, the domain name may correspond to multiple network addresses, which may identify different devices (e.g., validation device 220 or notification device 235). In some implementations, user device 205 may be configured with the domain name. Additionally, or alternatively, user device 205 may receive information identifying the domain name.

In some implementations, the network change message may request a network address (e.g., an IP address, a media access control (MAC) address, or the like) associated with the domain name, may request information identifying a network status of user device 205 (e.g., whether user device 205 is using cellular network 250 or WLAN 260 for network access), and/or may request information identifying whether to enable or disable validation requests, for example.

In some implementations, NPU 215 may receive the network change message. For example, if user device 205 is using cellular network 250 for network access (e.g., via base station 210 and/or mobile WLAN device 240), then NPU 215 may receive the network change message (e.g., from base station 210). NPU 215 may use the domain name to search a data structure to identify a network address (e.g., an IP address, or the like) associated with the domain name. In some implementations, NPU 215 may determine that the domain name is associated with a network address of validation device 220.

In some implementations, NPU 215 may provide user device 205 with information identifying the network address (e.g., an IP address) of validation device 220. User device 205 may receive, from NPU 215, information identifying the network address of validation device 220. In some implementations, user device 205 may send a request message, to validation device 220 (e.g., using a network address of validation device 220). For example, the request message may request information identifying a network status of user device 205 and/or request information identifying whether to enable or disable a toll-free data service, for example.

In some implementations, DNS 230 may receive the network change message. For example, if user device 205 is using WLAN 260 for network access (e.g., via WLAN access point 225), then DNS 230 may receive the network change message. DNS 230 may use the domain name to search a data structure to identify a network address (e.g., an IP address, or the like) associated with the domain name. In some implementations, DNS 230 may determine that the domain name is associated with a network address associated with notification device 235.

In some implementations, DNS 230 may provide user device 205 with information identifying the network address (e.g., an IP address) of notification device 235. User device 205 may receive, from NPU 215, information identifying the network address of notification device 235. In some implementations, user device 205 may send a request message, including a network address of notification device 235, requesting information identifying a network status of user device 205 and/or requesting information identifying whether to enable or disable a toll-free data service, for example.

In this way, user device 205 may send the network change message and/or the request message to a different device (or different devices) based on which network (e.g., cellular network 250 or WLAN 260) that user device 205 uses for network access.

As further shown in FIG. 4, process 400 may include receiving a response from either a first device or a second device (block 430). For example, user device 205 may receive a response from either validation device 220 or notification device 235 based on sending the network change message and/or the request message.

In some implementations, user device 205 may receive a response from validation device 220. For example, if user device 205 is using cellular network 250 for network access (e.g., via base station 210 and/or mobile WLAN device 240), then user device 205 may receive the response from validation device 220. In some implementations, the response from validation device 220 may include information identifying that user device 205 is using cellular network 250 for network access. Additionally, or alternatively, the response from validation device 220 may include an instruction for user device 205 to enable a toll-free data service.

A toll-free data service may permit a content provider to provide content to user device 205 by subsidizing the cost of network data usage associated with receiving the content. In some implementations, if user device 205 enables a toll-free data service, then user device 205 may send a validation request for a toll-free resource identifier (e.g., a URL). For example, user device 205 may request another device (e.g., validation device 220) to generate a toll-free resource identifier. User device 205 may receive the toll-free resource identifier and may access content using the toll-free resource identifier, for example. Network data usage associated with content accessed using the toll-free resource identifier may be billed to the content provider, for example.

Additionally, or alternatively, if user device 205 enables the toll-free data service, then user device 205 may add a signature (e.g., a string of one or more characters, letters, digits, numbers, etc.) to outbound toll-free data requests (e.g., hypertext transfer protocol (HTTP) requests, HTTP secure (HTTPS) requests, or the like). In some implementations, user device 205 may receive the signature from another device (e.g., validation device 220, or the like). In this way, NPU 215 and/or validation device 220 may identify the signature in one or more toll-free data requests, and may cause the content provider to be billed for data usage associated with the toll-free data service.

In some implementations, the response from validation device 220 may include an instruction for user device 205 to enable the toll-free data service. For example, validation device 220 and/or NPU 215 may determine whether user device 205 is accessing and/or requesting content that is associated with the toll-free service (e.g., content that is eligible to be toll-free). Additionally, or alternatively, validation device 220 and/or NPU 215 may determine whether user device 205 is executing an application that causes data (e.g., data associated with the toll-free service) to be transmitted and/or received via cellular network 250. Based on determining that user device 205 is accessing content associated with the toll-free data service, validation device 220 may instruct user device 205 to enable the toll-free data service (e.g., instruct user device 205 to send validation requests to validation device 220, add a signature to outbound HTTP requests, or the like).

Additionally, or alternatively, the response from validation device 220 may include an instruction for user device 205 to enable the toll-free data service if content associated with the toll-free data service is requested and/or accessed by user device 205. For example, validation device 220 and/or NPU 215 may determine that user device 205 is not accessing and/or requesting content associated with the toll-free data service. Additionally, or alternatively, validation device 220 and/or NPU 215 may determine that user device 205 is not executing an application that causes data (e.g., data associated with the toll-free data service) to be transmitted via cellular network 260. In some implementations, the response from validation 220 may permit user device 250 to enable the toll-free data service (e.g., send validation requests to validation device 220, add a signature to outbound HTTP requests, or the like) if content associated with the toll-free data service is requested and/or accessed.

In some implementations, user device 205 may receive a response from notification device 235. For example, if user device 205 is using WLAN 260 for network access (e.g., via WLAN access point 225), then user device 205 may receive the response from notification device 235. In some implementations, the response from notification device 235 may include information identifying that user device 205 is using WLAN 260 for network access. Additionally, or alternatively, the response from validation device 220 may include an instruction for user device 205 to disable a toll-free data service.

In this way, user device 205 may receive a response from either validation device 220 or notification device 235 and may selectively enable or disable a toll-free data service based on the response, as described below. For example, user device 205 may determine that the user device is not accessing a network associated with a toll-free data service based on the response, and may disable the toll-free data service accordingly. Additionally, or alternatively, user device 205 may determine that the user device is accessing a network (e.g., the cellular network) associated with a toll-free data service based on the response, and may enable the toll-free data service accordingly.

As further shown in FIG. 4, process 400 may include selectively enabling or disabling a toll-free data service based on the response (block 440). For example, user device 205 may enable or disable a toll-free data service based on the response. In some implementations, if user device 205 enables the toll-free data service, then user device 205 may request toll-free content (e.g., by requesting a toll-free resource identifier, by adding a signature to HTTP requests, or the like). Additionally, or alternatively, if user device 205 disables the toll-free data service, then user device 205 may request non-toll free content (e.g., may use a non-toll-free resource identifier, or the like).

In some implementations, user device 205 may enable the toll-free data service based on receiving the response from validation device 220. For example, user device 205 may determine that user device 205 is using cellular network 250 for network access and may enable the toll-free data service based on the response from validation device 220 (e.g., user device 205 is consuming data that may be charged to the content provider).

In some implementations, user device 205 may send a validation request, to validation device 220, based on identifying a request to access content (e.g., content associated with the toll-free data service) using a resource identifier (e.g., based on a user interaction with a user interface of user device 205). For example, user device 205 may identify a request to access content using a resource identifier when the user clicks on the resource identifier (e.g., a URL). In some implementations, the validation request may include a request for a toll-free resource identifier.

In some implementations, a request to access content using a resource identifier may be associated with an application. For example, the application may permit a user of user device 205 to access content associated with the toll-free data service, such as a webpage, an image, streaming media (e.g., audio or video), or the like. In some implementations, the application may cause user device 205 to transmit a request to access content using a resource identifier. In some implementations, user device 205 may identify a request to access content using a resource identifier based on a user interaction with the application (e.g., executing the application, etc.).

In some implementations, if the toll-free data service is enabled, then user device 205 may display (e.g., via a user interface) a graphical representation. For example, the graphical representation may identify that the toll-free data service is enabled. In some implementations, user device 205 may display the graphical representation based on receiving the response from validation device 220.

In some implementations, user device 205 may send, to NPU 215 and/or validation device 220, a report identifying that user device 205 is using cellular network 250 for network access. In some implementations, user device 205 may send the report based on receiving the response from validation device 220. In this way, NPU 215 and/or validation device 220 may store information identifying a quantity of times that user device 205 switches from using cellular network 250 for network access to using WLAN 260 for network access, and vice versa.

In some implementations, user device 205 may disable the toll-free data service based on receiving the response from notification device 235. For example, user device 205 may determine that user device 205 is using WLAN 260 for network access and may disable the toll-free data service (e.g., network usage by user device 205 may not be billed to a user associated with user device 205 and/or a content provider associate with the toll-free data service).

In some implementations, if user device 205 disables the toll-free data service, then user device 205 may access content using a non-toll-free resource identifier. In some implementations, if the toll-free data service is disabled, then user device 205 may not display (e.g., via a user interface) the graphical representation. In this way, user device 205 may notify a user (e.g., by not displaying the graphical representation) that user device 205 has disabled the toll-free data service.

Implementations described herein may conserve user device 205 battery and/or processor resources and/or network resources based on disabling a toll-free data service when user device 205 is not using cellular network 250 for network access. For example, user device 205 may not send validation requests based on disabling the toll-free data service, thereby conserving battery and/or processor resources. Additionally, implementations described herein may assist user device 205 in enabling a toll-free data service when user device 205 is using cellular network 250 for network access, thereby allowing user device to receive toll-free content.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Implementations described herein may assist a user device in enabling and/or disabling a toll-free data service based on a particular network that the user device is using for network access. Implementations herein may conserve user device battery and/or processor resources and/or network resources by disabling the toll-free data service when the user device is not using a cellular network associated with a toll-free data service. Additionally, implementations described herein may assist a user device in enabling the toll-free data service when the user device is using a network associated with a toll-free data service.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
  one or more processors to:
    detect a change in a connection being used for network access based on:
      the connection being switched from a base station to a network access point, or
      the connection being switched from the network access point to the base station;
    send a message based on detecting the change in the connection,
      the message including a domain name;
    receive a response from either a first device or a second device based on sending the message,
      the first device and the second device being associated with the domain name and having different network addresses; and
    selectively enable or disable a toll-free data service based on the response,
      the toll-free data service subsidizing a cost of network data usage associated with content provided by a content provider.

2. The device of claim 1, where the one or more processors, when receiving the response, are to:
  receive the response from the first device; and
  where the one or more processors, when selectively enabling or disabling the toll-free data service, are to:
    enable the toll-free data service based on receiving the response from the first device,
      the first device being accessed via a cellular network.

3. The device of claim 1, where the one or more processors, when receiving the response, are to:
  receive the response from the second device; and
  where the one or more processors, when selectively enabling or disabling the toll-free data service, are to:
    disable the toll-free data service based on receiving the response from the second device,
      the second device being accessed via a network other than a cellular network.

4. The device of claim 1, where the one or more processors, when detecting the change in the connection being used for network access, are to:
  detect the change based on switching from being connected to a wireless local area network to being connected to a cellular network.

5. The device of claim 1, where the one or more processors, when receiving the response to the message, are to:
  receive the response from the first device;
  where the one or more processors, when selectively enabling or disabling the toll-free data service, are to:
    enable the toll-free data service based on receiving the response from the first device; and
  where the one or more processors are further to:
    present, for display, a graphical representation based on enabling the toll-free data service,
      the graphical representation indicating that the toll-free data service is enabled.

6. The device of claim 1, where the one or more processors, when selectively enabling or disabling the toll-free data service based on the response, are to:
  enable the toll-free data service; and
  where the one or more processors are further to:
    output a validation request,
      the validation request being used to request a toll-free resource identifier,
        the toll-free resource identifier being used to access toll-free content.

7. The device of claim 1, where the one or more processors, when receiving the response, are to:
  receive the response from the first device,
    the first device being associated with a cellular network;
  where the one or more processors, when selectively enabling or disabling the toll-free data service, are to:
    enable the toll-free data service based on receiving the response from the first device; and where the one or more processors are further to:
    send a report, to a network device, based on enabling the toll-free data service,
        the report including information identifying that the device is using the cellular network.

8. A non-transitory computer-readable medium storing instructions, the instructions comprising:
    one or more instructions that, when executed by one or more processors of a device, cause the one or more processors to:
        detect a change in a connection being used for network access based on:
            the connection being switched from a base station to a network access point, or
            the connection being switched from the network access point to the base station;
        send a message based on detecting the change in the connection being used for network access,
            the message including a domain name;
        receive a response from either a first device or a second device based on sending the message,
            the first device and the second device being associated with the domain name and having different network addresses; and
        selectively enable or disable a toll-free data service based on the response,
            the toll-free data service subsidizing a cost of network data usage associated with content provided by a content provider.

9. The non-transitory computer-readable medium of claim 8, where the one or more instructions, that cause the one or more processors to receive the response, cause the one or more processors to:
    receive the response from the first device,
        the first device being accessed via a cellular network; and
    where the one or more instructions, that cause the one or more processors to selectively enable or disable the toll-free data service based on the response, cause the one or more processors to:
        enable the toll-free data service based on receiving the response from the first device.

10. The non-transitory computer-readable medium of claim 8, where the one or more instructions, that cause the one or more processors to receive the response, cause the one or more processors to:
    receive the response from the second device,
        the second device being accessed via a network other than a cellular network; and
    where the one or more instructions, that cause the one or more processors to selectively enable or disable the toll-free data service based on the response, cause the one or more processors to:
        disable the toll-free data service based on receiving the response from the second device.

11. The non-transitory computer-readable medium of claim 8, where the one or more instructions, when executed by one or more processors of the device, further cause the one or more processors to:
    determine that the device is connected to another device using a wireless connection,
        the other device using a cellular network for network access;
    where the one or more instructions, that cause the one or more processors to detect the change in the connection being used for network access, cause the one or more processors to:
        detect the change in the connection based on determining that the device is connected to the other device; and
    where the one or more instructions, that cause the one or more processors to receive the response, cause the one or more processors to:
        receive the response from the first device,
            the first device being accessed via the cellular network.

12. The non-transitory computer-readable medium of claim 8, where the one or more instructions, when executed by one or more processors of the device, further cause the one or more processors to:
    receive information identifying a network address associated with the first device based on sending the message; and
    send another message including the network address associated with the first device based on receiving information identifying the network address; and
    where the one or more instructions, that cause the one or more processors to receive the response, cause the one or more processors to:
        receive the response from the first device based on sending the other message.

13. The non-transitory computer-readable medium of claim 8, where the one or more instructions, when executed by one or more processors of the device, further cause the one or more processors to:
    receive information identifying a network address associated with the second device based on sending the message; and
    send another message including the network address associated with the second device based on receiving information identifying the network address; and
    where the one or more instructions, that cause the one or more processors to receive the response, cause the one or more processors to:
        receive the response from the second device based on sending the other message.

14. The non-transitory computer-readable medium of claim 8, where the one or more instructions, that cause the one or more processors to receive the response, cause the one or more processors to:
    receive the response from the first device,
        the first device being accessed via a cellular network;
    where the one or more instructions, that cause the one or more processors to selectively enable or disable the toll-free data service based on the response, cause the one or more processors to:
        enable the toll-free data service; and
    where the one or more instructions, when executed by one or more processors of the device, further cause the one or more processors to:
        present, for display, a graphical representation based on enabling the toll-free data service,
            the graphical representation identifying that the toll-free data service is enabled.

15. A method, comprising:
    detecting, by a device, a change in a connection being used for network access based on:
        the connection being switched from a base station to a network access point, or
        the connection being switched from the network access point to the base station;
    sending, by the device, a message based on detecting the change in the connection being used for network access, the message including a domain name;
receiving, by the device, a response from either a first device or a second device based on sending the message,
the first device and the second device being associated with the domain name and having different network addresses,
the first device being associated with a cellular network, and
the second device being associated with a data network; and
selectively enabling or disabling, by the device, a toll-free data service based on the response,
the toll-free data service subsidizing a cost of network data usage associated with content provided by a content provider.

16. The method of claim 15, where receiving the response comprises:
receiving the response from the first device,
the first device being accessed via the cellular network; and
where selectively enabling or disabling the toll-free data service based on the response comprises:
enabling the toll-free data service based on receiving the response from the first device.

17. The method of claim 15, where receiving the response comprises:
receiving the response from the second device,
the second device being accessed via the data network; and
where selectively enabling or disabling the toll-free data service based on the response comprises:
disabling the toll-free data service based on receiving the response from the second device.

18. The method of claim 15, where selectively enabling or disabling the toll-free data service based on the response comprises:
enabling the toll-free data service; and
where the method further comprises:
outputting a validation request after enabling the toll-free data service,
the validation request being used to request a toll-free resource identifier.

19. The method of claim 15, where receiving the response comprises:
receiving the response from the first device,
the first device being accessed via the cellular network; and
where the method further comprises:
sending a report based on receiving the response,
the report including information identifying that the device is using the cellular network.

20. The method of claim 15, further comprising:
receiving a network address from either a third device or a fourth device based on sending the message including the domain name,
the network address being associated with either the first device or the second device.

* * * * *